US010609524B2

(12) United States Patent
Li et al.

(10) Patent No.: US 10,609,524 B2
(45) Date of Patent: *Mar. 31, 2020

(54) KEYWORD-BASED INFORMATION PROCESSING METHOD AND DEVICE (71) Applicant: Alibaba Group Holding Limited, George Town (KY)

(72) Inventors: Lihong Li, Hangzhou (CN); Xudong Sun, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,178

(22) Filed: Oct. 25, 2018

(65) Prior Publication Data

US 2019/0069143 A1 Feb. 28, 2019

Related U.S. Application Data (63) Continuation of application No. 15/315,666, filed as application No. PCT/CN2015/079582 on May 22, 2015, now Pat. No. 10,149,123.

(30) Foreign Application Priority Data

Jun. 9, 2014 (CN) .......................... 2014 1 0252085

(51) Int. Cl.
*H04W 4/12* (2009.01)
*H04M 1/725* (2006.01)
(Continued)

(52) U.S. Cl.
CPC ......... *H04W 4/12* (2013.01); *H04M 1/72522* (2013.01); *H04W 12/04* (2013.01); *G10L 2015/088* (2013.01); *H04M 1/72552* (2013.01)

(58) Field of Classification Search
CPC ......... H04W 4/14; H04W 4/12; H04W 8/183; G06Q 10/107; H04M 1/72522;
(Continued)

(56) References Cited

U.S. PATENT DOCUMENTS 6,108,422 A 8/2000 Newby
6,321,257 B1 11/2001 Kotola
(Continued)

FOREIGN PATENT DOCUMENTS

CN 1801976 A 7/2006
CN 101494832 A 7/2009
(Continued)

*Primary Examiner* — Olumide Ajibade Akonai
(74) *Attorney, Agent, or Firm* — Van Pelt, Yi & James LLP (57) ABSTRACT The embodiments of the present invention disclose an information processing method and device. The method of the embodiments of the present invention comprises: receiving a first message sent by a network side; based on locally stored key words, if a first key word that matches a locally stored key word is extracted from said first message, then a first label is set up for said first message; said first message is a short message or multimedia message; upon receipt of a command to display said first message, a locally stored first piece of information associated with said first key word is displayed, and, when said first label is triggered, a query of the network side for a second piece of information associated with said first key word is performed, and said second piece of information found through the query is displayed. In the embodiments of the present invention, the first message can be displayed directly, and the first label corresponding to said first message can be added, so that when the user triggers the first label, they can immediately obtain a second message, thereby enabling the user to obtain the associated information in a more intuitive manner.

24 Claims, 4 Drawing Sheets (51) Int. Cl.
*H04W 12/04* (2009.01)
*G10L 15/08* (2006.01)

(58) Field of Classification Search
CPC ........ H04M 1/72552; H04M 1/274558; G06F
17/3043; G06F 17/30477; G06F 17/2705;
G06F 17/30876; G06F 17/2785; G06F
17/30696; G06F 17/2229; H04L 67/306
See application file for complete search history.

(56) References Cited

U.S. PATENT DOCUMENTS

| | | | |
|---|---|---|---|
| 6,424,995 B1 | 7/2002 | Shuman | |
| 6,708,202 B1 | 3/2004 | Shuman | |
| 6,920,605 B1 | 7/2005 | Challenger | |
| 7,266,535 B1 | 9/2007 | Nelken | |
| 10,149,123 B2 * | 12/2018 | Li | H04W 4/12 |
| 2002/0120600 A1 | 8/2002 | Schiavone | |
| 2008/0005691 A1 | 1/2008 | Malik | |
| 2010/0100909 A1 | 4/2010 | Arsenault | |
| 2011/0119258 A1 | 5/2011 | Forutanpour | |
| 2011/0131221 A1 | 6/2011 | Bhide | |
| 2013/0185336 A1 | 7/2013 | Singh | |
| 2014/0115708 A1 | 4/2014 | Terwilliger | |
| 2014/0135069 A1 | 5/2014 | Jung | |

FOREIGN PATENT DOCUMENTS

| | | | |
|---|---|---|---|
| CN | 101873553 A | 10/2010 | |
| CN | 103249016 A | 8/2013 | |

* cited by examiner

FIG. 1

Dear, your product has been shipped. The tracking number is: ******

View more shipping information

Order number ****, shirt, 199 yuan...

| | |
|---|---|
| 2014/1/20 00:30 | Shipped by seller |
| 2014/1/20 19:00 | Received by Jiangsu ** Company |
| 2014/1/20 19:30 | Shipped by Jiangsu ** Company to ** transfer station |
| 2014/1/21 21:30 | Shipped by ** tranfer station to Shanghai ** transfer station |
| 2014/1/22 02:30 | Shipped by Shanghai ** transfer station to Shanghai ** Company |
| 2014/1/22 09:30 | Express package arrived at Shanghai ** Company |
| 2014/1/22 10:30 | Out for delivery |

KEYWORD-BASED INFORMATION PROCESSING METHOD AND DEVICE

CROSS REFERENCE TO OTHER APPLICATIONS

This application is a continuation of co-pending U.S. patent application Ser. No. 15/315,666, entitled KEYWORD-BASED INFORMATION PROCESSING METHOD AND DEVICE filed Dec. 1, 2016 which is incorporated herein by reference for all purposes, which claims priority to International (PCT) Application No. PCT/CN2015/079582 entitled AN INFORMATION PROCESSING METHOD AND DEVICE, filed May 22, 2015 which claims priority to Peoples Republic of China Patent Application No. 201410252085.2 entitled AN INFORMATION PROCESSING METHOD AND DEVICE, filed Jun. 9, 2014 both of which are incorporated herein by reference for all purposes.

FIELD OF THE INVENTION

The present application involves the field of communications technology; in particular, it involves an information processing method and device.

BACKGROUND OF THE INVENTION

Along with the continuous development of electronic commerce, online shopping has become increasingly common. In real life, after a user completes an online shopping activity, they will receive many notification messages related to the online shopping in short message format. For example, after a user completes ordering and payment on Taobao, they receive a short message notification sent by the seller after the order has been shipped, to notify the user of the shipment tracking number; and, after a user has completed a booking for an airline ticket or movie ticket online, they receive a short message notification that the booking was successful. Under normal circumstances, after the user has received these short messages, they use a mobile telephone or PC to log on to the transaction system website to look up information related to the order or shipping based on the key words in the short message; for example, the shipment tracking number, the flight number, or the movie title. For example, based on the shipment tracking number displayed in the short message, the user must log on to the Taobao website or the official website of the relevant shipping company to perform a query in order to obtain specific tracking information for the merchandise.

In summary, in the prior art, after a short message containing a key word is received at the terminal, there is no way to retrieve information associated with this key word directly, requiring the user to log on to the relevant website or system to perform a query based on the key word before the associated information can be retrieved. This is operationally complex and additionally results in the expenditure of network resources.

SUMMARY OF THE INVENTION

The present invention provides an information processing method and device intended to resolve the problem of the user's inability to retrieve information associated with a key word directly upon receiving a short message containing a key word.

The embodiments of the present invention provide an information processing method comprising:

Receiving a first message sent by the network side; based on locally stored key words, if a first key word that matches a locally stored key word is extracted from said first message, then a first label is set up for said first message; said first message is a short message or multimedia message;

Upon receipt of a command to display said first message, a locally stored first piece of information associated with said first key word is displayed, and, when said first label is triggered, a query is performed of the network side for a second piece of information associated with said first key word, and said second piece of information that is found through the query is displayed.

Preferably, after said first key word that matches the locally stored key word is extracted from said first message based on locally stored key words, the method further comprises:

Based on the extracted first key word, a query is performed for a locally stored database ID corresponding to said first key word;

A second label is created, said second label comprising the first key word extracted from said first message and the database ID corresponding to said first key word;

Said query of the network side for the second piece of information associated with said first key word comprises:

Based on the database ID and the first key word contained in said second label, a query request is sent to a database corresponding to said database ID, said query request containing said first key word;

A query response returned by said database is received, said query response containing the second piece of information associated with said first key word.

Preferably, the method further comprises:

Receiving a second message sent by the network side; if a second key word extracted from said second message is the same as said first key word, then the locally stored said first key word and said first piece of information associated with said first key word are deleted.

Preferably, said first message is a shipment notification message sent by a transaction system, and said first key word is a shipment tracking number and/or order number contained in the shipment notification message;

And said second message is an order complete notification sent by the transaction system, and said second key word is the order number and/or the shipment tracking number contained in the order complete notification message.

Preferably, said first message is a shipment notification message sent by a transaction system, and said first key word is a shipment tracking number and/or order number contained in the shipment notification message.

The embodiments of the present invention provide an information processing device comprising:

A receiving module, used to receive a first message sent by a network side;

A processing module, used, based on locally stored key words, if a first key word that matches a locally stored key word is extracted from said first message, to set up a first label for said first message, said first message is a short message or multimedia message;

A querying module, used, based on the extracted first key word, to search for a locally stored first piece of information associated with said first key word; and, when said first label is triggered, to perform a query of the network side for a second piece of information associated with said first key word.

A display module, used to display said first message and said second message found through the queries.

Preferably, said processing module is also used to:

Create a second label, said second label comprising the first key word extracted from said first message and a database ID corresponding to the first key word;

Said querying module is further used to:

Based on the extracted first key word, perform a query for the locally stored database ID corresponding to said first key word, and provide it to said processing module;

And, based on the database ID and the first key word contained in said second label, send a query request to a database corresponding to said database ID, said query request containing said first key word; and to receive a query response returned by said database, said query response containing the second piece of information associated with said first key word.

Preferably, said receiving module is further used to:

Receive a second message sent by the network side;

Said processing module is further used to:

If a second key word extracted from said second message is the same as said first key word, delete the locally stored said first key word and said first piece of information associated with said first key word.

Preferably, said first message is a shipment notification message sent by a transaction system, and said first key word is a shipment tracking number and/or order number contained in the shipment notification message;

Said second message is an order complete notification sent by the transaction system, and said second key word is the order number and/or shipment tracking number contained in the order complete notification message.

In the embodiments of the present invention, a first message sent by a network side is received; based on locally stored key words, if a first key word that matches a locally stored key word is extracted from said first message, then a first label is set up for said first message; said first message is a short message or multimedia message; upon receipt of a command to display said first message, a locally stored first piece of information associated with said first key word is displayed, and, when said first label is triggered, a query of the network side for a second piece of information associated with said first key word is performed, and said second piece of information found through the query is displayed. In the embodiments of the present invention, the first piece of information can be displayed directly, and a first label corresponding to said first message can be added; by triggering the first label, the user can obtain the second piece of information immediately, thereby enabling the user to obtain the associated information in a more intuitive manner.

BRIEF DESCRIPTION OF THE DRAWINGS

Various embodiments of the invention are disclosed in the following detailed description and the accompanying drawings.

DETAILED DESCRIPTIONS

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the embodiments of the present invention, by receiving a command to display a first message, a first piece of information associated with a key word contained in the first message is displayed directly, and a first label corresponding to said first message is added; when the user triggers the first label, they can immediately obtain a second piece of information associated with this key word, thereby enabling the user to obtain the associated information more conveniently and intuitively, and further conserving the expenditure of network resources.

Further detailed descriptions of embodiments of the present application are provided below in light of the drawings.

Figure 1:
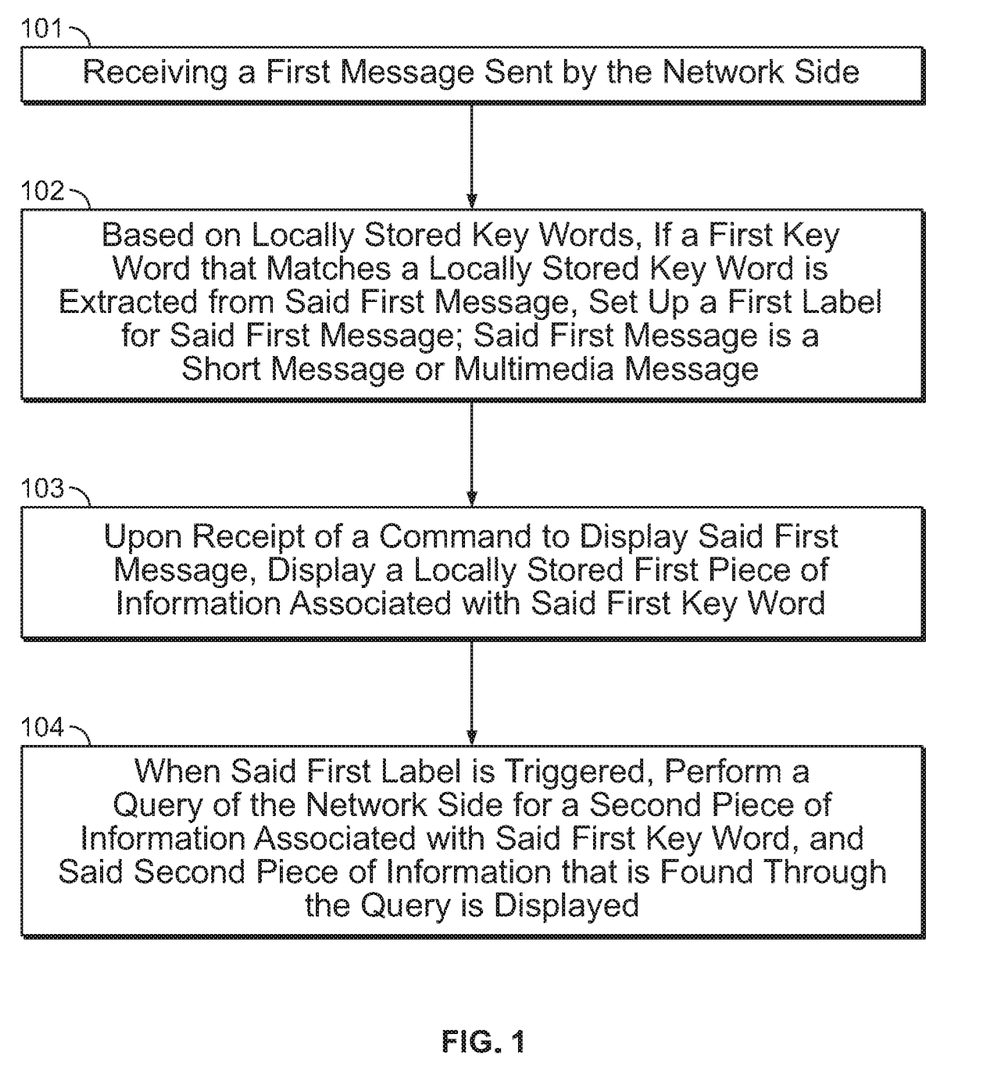
FIG. 1 is a flowchart of the information processing method in the embodiments of the present invention.

FIG. 1 is a flowchart corresponding to an information processing method offered in the embodiments of the present invention. This process can be realized on the terminal side. This information processing method primarily comprises step 101 through step 104 below:

Step 101, receiving a first message sent by the network side;

Step 102, based on locally stored key words, if a first key word that matches a locally stored key word is extracted from said first message, then a first label is set up for said first message; said first message is a short message or a multimedia message;

Step 103, upon receipt of a command to display said first message, a locally stored first piece of information associated with said first key word is displayed;

Step 104, when said first label is triggered, a query of the network side for a second piece of information associated with said first key word is performed, and a second message found through the query is displayed.

Figure 2:
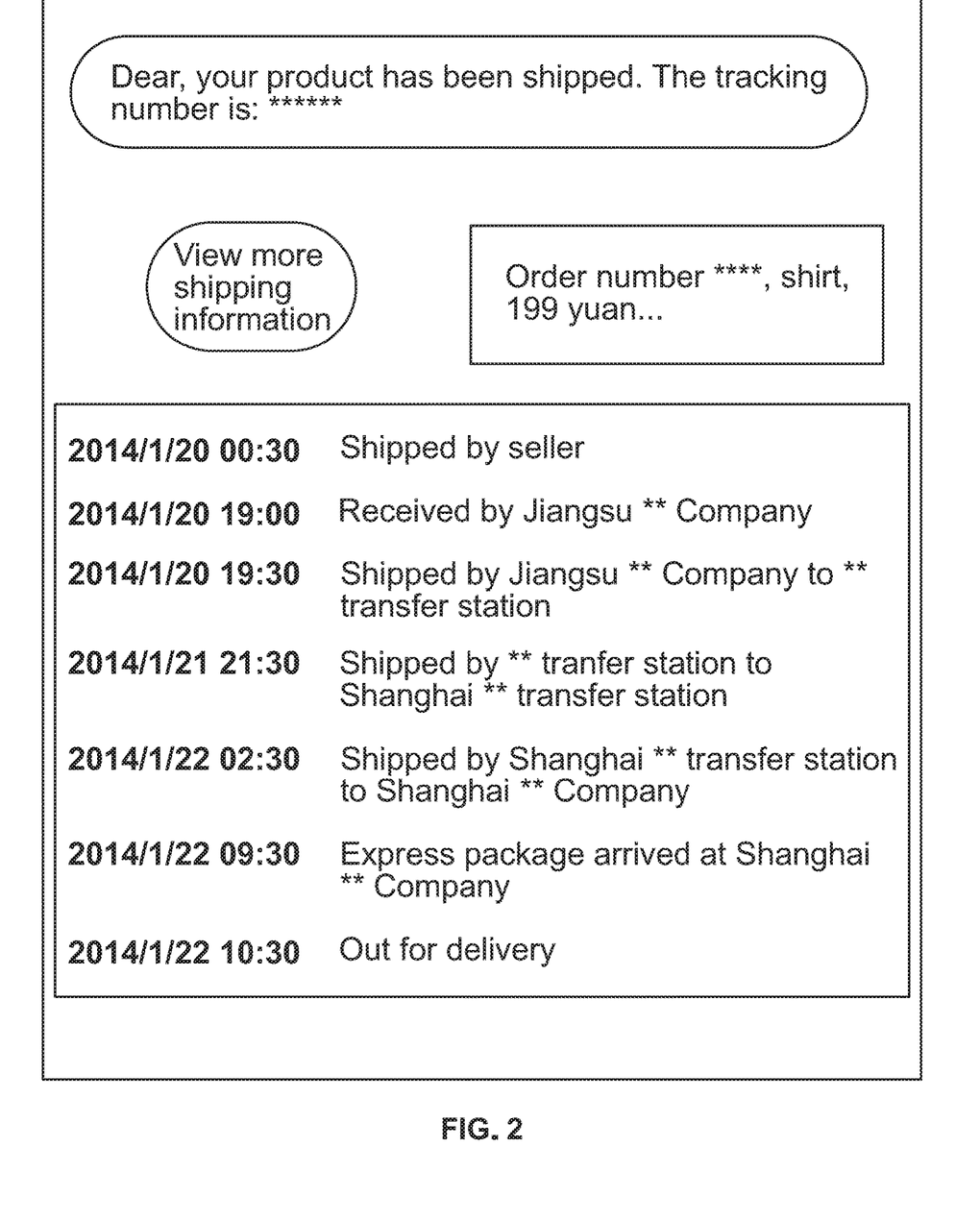
FIG. 2 is a schematic diagram of the terminal interface in the embodiments of the present invention.

Optionally, said first message in step 101 is a shipment notification message sent by the transaction system, and said first key word is the shipment tracking number and/or the order number contained in the shipment notification message; in the interface shown in FIG. 2, the shipment notification message is: "Dear, your treasured object has been shipped. The tracking number is:****"; and the first key word is "****".

Optionally, in step 102, a variety of methods can be used to realize the extraction of the first key word.

Example 1, a message format for the short message shipment notification can be arranged in advance by the terminal and the transaction system on the network side; when the transaction system sends the short message shipment notification, transmission is carried out in accordance with this stipulated message format, and this stipulated message format specifies the location in said short message of the shipment tracking number contained in the shipment notification. For example, the short message format of the shipment notification is as follows:

"Dear, your treasured object has been shipped. The shipment tracking number is: ******".

Upon receipt of this short message in the stipulated format, the terminal can then extract the shipment tracking number according to the formatting rules for this short message.

Example 2: The terminal receives a first message sent by the network side, performs parse processing on the first message to obtain one or more key words, uses the key words obtained to perform a comparison against locally stored key words, and then extracts from the first message a first key word that matches a locally stored key word.

Optionally, certain information associated with the key words contained in short messages or multimedia messages in a first set message format can be stored locally on the terminal; here, this information will be referred to as the first piece of information. For example, certain order information of the user could be stored locally on the terminal. In this way, when said first set message format is a message format set up for shipment notifications sent by the transaction system, using step 102, the terminal is able to extract the shipment tracking number from a first message that conforms to a first set message format, and in step 103, perform a query for the locally stored order number corresponding to this shipment tracking number and product information corresponding to the order number, and display this information; for example, in the interface shown in FIG. 2, "Order number****, shirt, 199 yuan . . . " is the first piece of information.

Optionally, in step 102, upon extracting the shipment tracking number from the first message, highlighting or a different color or other methods may be further employed to make the shipment tracking number more eye-catching.

Optionally, in step 103, the first label added to the first message by the terminal can be a function button; as shown in FIG. 2, "View more shipping information" is one form of the first label offered in the embodiments of the present application. The first label can also be a display of the first key word contained in said first message using the hyperlink method; for example, the order number "**" in the interface shown in FIG. 2 can be displayed using highlighting; when the user clicks the highlighted order number "**," retrieval of the second piece of information is triggered. Or, this first label can be another form of a link, as long as it can be triggered by the user to retrieve the second piece of information. Further examples of the form of said first label will not be enumerated here.

Optionally, in step 104, when said first label is triggered, the terminal can send a query request to the transaction system on the network side, said query request containing said first key word, used to request the transaction system on the network side to perform a query for a second piece of information corresponding to said first key word; upon receipt of the query response, if it contains a second piece of information found through the query, the second piece of information found through the query is then displayed.

Preferably, the first piece of information and information about the database of the transaction system corresponding to the first piece of information are stored locally on the terminal (for example, data IDs or access addresses, etc.). For example, the second piece of information is the order number and order contents, and a database ID corresponding to the order number and order contents has been recorded; this database is used to store shipping information, in order to demonstrate that information related to the shipping of this order can be obtained by querying the database identified by this database ID.

Correspondingly, in step 102, upon extraction of the first key word from said first message, based on the extracted first key word, the terminal can also perform a query for the locally stored database ID corresponding to said first key word and create a second label, said second label comprising the first key word extracted from said first message and the database ID corresponding to said first key word. This second label can identify the retrieval source of the second piece of information, for example, identify the database from which the second piece of information has been retrieved; this second label may correspond to the first message, or it may also correspond to the first key word, or it may further correspond to the first label.

Correspondingly, in step 104, upon detecting that the first label contained in said first message has been triggered, the terminal retrieves the second label and, based on the database ID and the first key word contained in said second label, sends a query request to the database corresponding to said database ID, said query request containing said first key word, in order to request a query for a second piece of information corresponding to this first key word; and, upon receipt of the query response returned by said database, retrieves the second piece of information associated with said first key word contained in said query response and displays it. Wherein, if the second label corresponds to the first message, then, based on the first message to which the triggered first label belongs, the second label corresponding to this first message is retrieved; if the second label corresponds to the first label, the second label corresponding to the first label is retrieved; if the second label corresponds to the first key word, based on the first key word contained in the first message to which the triggered first label belongs, the second label to which this first key word corresponds is retrieved.

Preferably, this method further comprises: receiving a second message sent by the network side; if the second key word extracted from said second message is the same as said first key word, then the locally stored said first key word and said first piece of information associated with said first key word are deleted. By using this method to perform timely cleanup of information stored in local databases, the problem of increasing accumulation of information stored in local databases can be avoided, thereby rationalizing the utilization of storage resources.

Said method of extracting the second key word from the second message is the same as the method of extracting the key word from the first message.

When the first message is a shipment notification message having a set message format sent by the transaction system, said second message can be an order complete notification message having a set format sent by the transaction system.

For example, the terminal receives a short message or multimedia message that conforms to the second set message format, said short message or multimedia message being information notifying the user of changes in the shipping status or flight number. The terminal extracts a second key word from said short message or multimedia message; the second key word can be a shipment tracking number or a flight number; if the shipment tracking number or flight number at this time is the same as the shipment tracking number or flight number contained in the first message, this indicates that the shipment has already been signed for or the takeoff time of the flight number has already passed; therefore, the locally stored shipment tracking number or flight number and the first piece of information associated with said shipment tracking number or flight number are deleted.

Preferably, said second message is an order complete notification sent by the transaction system, and said second key word is the order number and/or the shipment tracking number contained in the order complete notification message.

Preferably, upon receipt of a first message sent by the network side, based on locally stored key words, if a first key word that matches a locally stored key word is extracted from said first message, then the terminal sets up a label for said first message; when the terminal receives a command to display the first message, it retrieves the label for the first message, and, based on the label, performs a query in local storage for a first piece of information associated with said first key word, and displays the first piece of information.

In one embodiment of the present application, the first piece of information and the first label can be displayed in the terminal interface where the first message is located, so that the user is able to view the first piece of information and trigger the first label.

In one embodiment of the present application, it is not necessary to display the second label in the terminal interface in which the first message is located.

In order to provide a clearer understanding of the embodiments of the present application, they are described below in light of a specific application scenario. In this application scenario, the terminal and the system arrange in advance a short message format for order generation notifications, and arrange in advance a short message format for order complete notifications.

Upon receipt of an order generation notification short message sent by the Taobao system, based on the content of this short message, the terminal saves such information as the order number, shipment tracking number, product name, product image, and product price in a local database. Based on the sender information of this short message (such as the sender's number or address), the terminal can also determine the corresponding database ID and save it to the local database, and establish a correspondence between this database and the order number or shipment tracking number information extracted from this short message.

Upon receipt of an order notification short message, in accordance with the prearranged short message format for order generation notifications, the terminal extracts the shipment tracking number from this short message, and sets this shipment tracking number to be displayed with highlighting. Based on this shipment tracking number, the terminal performs a query for a first piece of information associated with this shipment tracking number, i.e., the order number, product name, product image, product price, etc., stored in a local database, and displays it in the short message interface. The terminal also performs a query for a locally stored database ID corresponding to said shipment tracking number, and creates a second label corresponding to said short message, this second label comprising the shipment tracking number extracted from said first message and the database ID corresponding to said shipment tracking number. The terminal adds a function button of a specified color at the bottom of said short message, with the wording "view more shipping information" displayed on the function button. In this way, the user will be able to see that the shipment tracking number is displayed with highlighting in this short message, and there is a "view more shipping information" button at the bottom of the short message.

When the user triggers said button, the terminal sends a request to the network side to perform a query for a second piece of information associated with said shipment tracking number; the second piece of information can be tracking information for the shipment, including the date and time shipped, shipping origin, shipping progress locations, expected arrival time at destination, etc. The network side returns said second piece of information found through the query to the terminal; as shown in FIG. 2, the terminal receives said second piece of information and displays it to the user. By triggering the button, the user can obtain the second piece of information without logging in to the Taobao website or the official website of the relevant shipping company to look up the information in order to obtain specific tracking information for the merchandise, thus enabling the user to obtain the associated information in a more intuitive manner, and conserving the expenditure of network resources.

Upon receipt of an order complete short message, in accordance with the prearranged order complete short message format, the terminal extracts the shipment tracking number from this short message; if the shipment tracking number at this time is the same as the shipment tracking number extracted from the aforesaid order generation notification, this indicates that this shipment has already been signed for, and the terminal deletes this shipment tracking number and the order number, product name, product image, and product price information associated with this shipment tracking number stored in the local database, thereby facilitating rational utilization of storage resources.

Regarding the processes of the method described above, the embodiments of the present invention also provide an information processing device; reference may be made to the method embodiment above for the specific contents of this device; they will not be repeated here.

Figure 3:
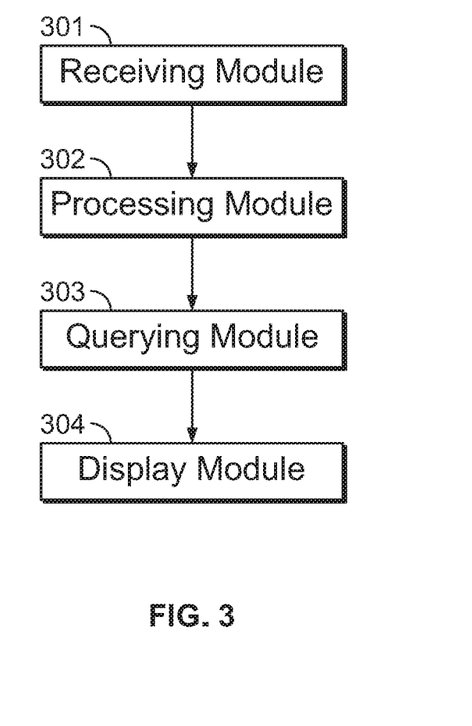
FIG. 3 is a schematic diagram of the information processing device in the embodiments of the present invention.

For the information processing device offered in the embodiments of the present invention, please refer to the depiction in FIG. 3. The information processing device in the embodiments of the present invention comprises:

A receiving module 301, used to receive a first message sent by the network side;

A processing module 302, used, if a first key word that matches a locally stored key word is extracted from said first message, to set up a first label for said first message; said first message is a short message or multimedia message;

A querying module 303, used, based on the extracted first key word, to perform a query for a locally stored first piece of information associated with said first key word; and, when said first label is triggered, to perform a query of the network side for a second piece of information associated with said first key word;

A display module 304, used to display said first piece of information and said second piece of information found through the queries.

Preferably, said processing module 302 is further used to: create a second label, said second label comprising the first key word extracted from said first message and the database ID corresponding to the first key word;

Said querying module 303 is further used to: based on the extracted first key word, perform a query for the locally stored database ID corresponding to said first key word, and return said database ID corresponding to the first key word found through the query to said processing module 302. Correspondingly, said querying module 303 is further used to: based on the database ID and first key word contained in said second label, send a query request to said database corresponding to the database ID, said query request containing said first key word; and receive the query response returned by said database, said query response containing a second piece of information associated with said first key word.

Preferably, said receiving module 301 is further used to: receive a second message sent by the network side;

Said processing module 302 is further used to: if the second key word extracted from said second message is the same as said first key word, delete the locally stored said first key word and said first piece of information associated with said first key word.

Preferably, said first message is a shipment notification message sent by the transaction system, and said first key word is the shipment tracking number and/or the order number contained in the shipment notification message;

Said second message is an order complete notification sent by the transaction system, and said second key word is the order number and/or the shipment tracking number contained in the order complete notification message.

Figure 4:
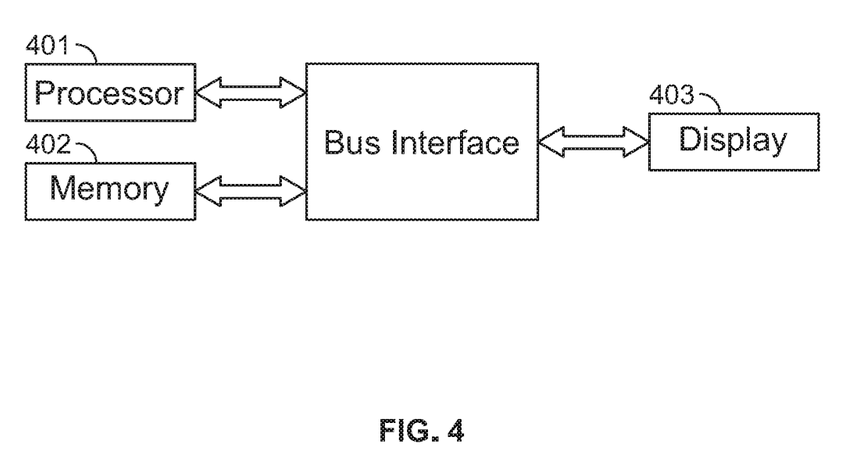
FIG. 4 is a schematic diagram of another information processing device in the embodiments of the present invention.

For another information processing device offered in the embodiments of the present invention, refer to the depiction in FIG. 4. Another information processing device of the embodiments of the present invention comprises: a processor 401, a monitor 403, and may further comprise a memory 402, said processor 401 and memory 402 being connected to the monitor using a bus interface.

Said processor 401 is used to receive a first message sent by the network side; based on locally stored key words, if a first key word that matches a locally stored key word is extracted from said first message, then a first label is set up for said first message; said first message is a short message or multimedia message; based on the extracted first key word, a query is performed for a locally stored first piece of information associated with said first key word; when said first label is triggered, a query is performed of the network side for a second piece of information associated with said first key word;

Said memory 402 is used to store said short messages, key words, programs, intermediate operation results, and the final operation results;

Said monitor 403 is used to display said first piece of information and said second piece of information found through the queries. Preferably, said processor 401 is further used to:

Create a second label corresponding to said first message, said second label comprising the first key word extracted from said first message and the database ID corresponding to the first key word; based on the extracted first key word, a query is performed for the locally stored database ID corresponding to said first key word; based on said first message to which the triggered first label belongs, a second label corresponding to said first message is retrieved; based on the database ID and the first key word contained in said second label, a query request is sent to the database corresponding to said database ID, said query request containing said first key word; and a query response returned by said database is received, said query response containing a second piece of information associated with said first key word.

Preferably, said processor 401 is further used to:

Receive a second message sent by the network side; used if the second key word extracted from said second message is the same as said first key word, to delete the locally stored said first key word and said first piece of information associated with said first key word.

Preferably, said first message is a shipment notification message sent by the transaction system, and said first key word is the shipment tracking number and/or the order number contained in the shipment notification message;

And said second message is an order complete notification sent by the transaction system, and said second key word is the order number and/or the shipment tracking number contained in the order complete notification message.

From the foregoing it can be seen that:

In the present application, a first message sent by the network side is received; based on locally stored key words, if a first key word that matches a locally stored key word is extracted from said first message, then a first label is set up for said first message; said first message is a short message or multimedia message; when a command to display said first message is received, a locally stored first piece of information associated with said first key word is displayed, and when said first label is triggered, a query is performed of the network side for a second piece of information associated with said first key word, and said second piece of information found through the query is displayed. In the embodiments of the present invention, a first piece of information associated with the key word contained in the first message can be displayed directly, and a first label corresponding to said first message can be added; by triggering the first label, the user is able to immediately obtain a second piece of information associated with this key word, thereby enabling the user to obtain the associated information more conveniently and intuitively, and eliminating interactive processing required for the user to use the terminal to log on to the relevant website or system to send query requests, thus conserving the expenditure of network resources.

A person skilled in the art should understand that the embodiments of the present invention can be provided as methods, systems, or computer program products. Therefore, the present invention may take the form of complete hardware embodiments, complete software embodiments, or embodiments that combine software and hardware. Moreover, the present invention may take the form of computer program products using one or more computer-operable storage media (including but not limited to magnetic disk storage, CD ROMs, and optical storage) containing computer-operable program code.

The present invention is described with reference to flowcharts and/or block diagrams based on the methods, equipment (systems), and computer program products of embodiments of the present invention. It should be understood that each process and or block contained in the flowcharts and/or block diagrams, and combinations of processes and/or blocks contained in the flowcharts and/or block diagrams, can be realized by computer commands. One can provide these computer commands to a general-purpose computer, a specialized computer, an embedded processor, or the processor of other programmable data processing equipment so as to give rise to a machine, with the result that the commands executed through the computer or processor of other programmable data processing equipment give rise to a device that is used to realize the functions designated by one or more processes in a flowchart and/or one or more blocks in a block diagram.

These computer program commands can also be stored in computer-readable memory that guides the computer or other programmable data processing equipment to operate in a specified manner, so that the commands stored in this computer-readable memory give rise to a product that includes the command device, and this command device realizes the functions designated in one or more processes in a flowchart and/or one or more of the blocks in a block diagram.

These computer program commands can also be loaded onto a computer or other programmable data equipment, with the result that a series of operating steps are executed on a computer or other programmable equipment so as to give rise to computer processing. In this way, the commands executed on a computer or other programmable equipment provide steps for realizing the functions designated by one or more processes in a flowchart and/or one or more blocks in a block diagram.

Although preferred embodiments of the present invention have been described, a person skilled in the art can make changes and modifications to these embodiments as soon as they learn the basic creative concept. Therefore, the attached claims are intended to be interpreted as including the preferred embodiments as well as all modifications and revisions falling within the scope of the present invention.

Obviously, a person skilled in the art may subject the present invention to various modifications and variations without departing from the spirit and scope of the present invention. Thus, if these modifications to and variations of the present invention lie within the scope of its claims and equivalent technologies, then the present invention intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving, by a terminal, a first message comprising a first key word;
    in response to receiving an input associated with displaying the first message, displaying, by the terminal, a first part of information associated with the first key word, the displaying the first part of information associated with the first keyword comprising:
        providing one or more function objects on an interface on which the first part of the information associated with the first key word is displayed, wherein the one or more function objects cause the terminal to perform one or more corresponding functions in response to selection of the one or more function objects;
    receiving an input associated with the first part of information;
    in response to receiving the input associated with the first part of information, obtaining, from a server associated with a database comprising transaction information, a second part of information associated with the first key word, the obtaining the second part of information comprising:
        sending a query to the server, wherein the sending the query to the server is included in the one or more functions performed in response to selection of the one or more function objects, the query comprising the first key word; and
        obtaining, from the server, a response to the query, the response to the query comprising the second part of information, wherein the second part of information corresponds to a transaction associated with a user account, the server associated with the database comprising transaction information not requiring a user associated with the user account to input credentials in order for the second part of information to be provided in connection with the query; and
    displaying a second message based at least in part on the second part of information associated with the first key word, wherein the second message is displayed on a same interface on which the first part of information is displayed.

2. The method of claim 1, further comprising:
    extracting a second key word from the second message;
    determining whether the second key word matches the first key word; and
    in response to a determination that the second key word matches the first key word, deleting information associated with the first message.

3. The method of claim 2, wherein the deleting of the information associated with the first message comprises deleting product information or order information.

4. The method of claim 3, wherein the product information or order information is deleted from a local database.

5. The method of claim 1, wherein the input associated with the first part of information corresponds to selection of the first part of information.

6. The method of claim 1, wherein the first message corresponds to a message associated with a Short Messaging Service (SMS) or a Multimedia Message Service (MMS).

7. The method of claim 1, wherein the first part of information associated with the first key word is stored locally at a client.

8. The method of claim 7, wherein the first part of information corresponds to information associated with an order submitted to a network.

9. The method of claim 1, further comprising:
    extracting the first key word from the first message.

10. The method of claim 9, wherein the extracting the first key word from the first message comprises comparing one or more words comprised in the first message to a locally stored database of key words and determining at least one of the one or more key words to be the first key word based at least in part on the at least one of the one or more key words matching at least one key word comprised in the locally stored database of key words.

11. The method of claim 1, wherein the obtaining of the second part of information associated with the first key word comprises querying a database for the second part of information.

12. The method of claim 11, wherein the querying the database for the second part of information comprises querying a transaction system that is connected to a network for the second part of information corresponding to the first key word.

13. The method of claim 1, wherein the first message is communicated in a first predefined format.

14. The method of claim 1, wherein the input associated with the first part of information comprises selecting a hyperlink associated with the first part of information.

15. The method of claim 1, wherein the outputting the second message comprises outputting the second message to be displayed.

16. The method of claim 1, wherein the first key word comprises product information or order information.

17. The method of claim 1, further comprising:
determining whether a set of locally stored key words comprises the first key word; and
in response to determining that the set of locally stored key words comprises the first key word, configuring a first label corresponding to the first message,
wherein displaying the first part of information associated with the first key word comprises displaying the first label.

18. The method of claim 17, wherein the first label is a button displayed on an interface.

19. The method of claim 1, wherein the obtaining the second part of information associated with the first key word comprises:
querying a database storing transaction information, the second part of information corresponding to a transaction associated with a user account for a web service.

20. The method of claim 1, wherein the first part of information and the second part of information correspond to a same transaction.

21. The method of claim 20, wherein the transaction with respect to an e-commerce website is associated with an account of a user with respect to an e-commerce website.

22. The method of claim 1, wherein the input associated with the first part of information corresponds to a request for additional information pertaining to a transaction with which the first message is associated.

23. A device, comprising:
one or more processors configured to:
receive a first message comprising a first key word;
in response to receiving an input associated with displaying the first message, cause a first part of information associated with the first key word to be displayed, to cause the first part of information associated with the first key word to be displayed comprises:
provide one or more function objects on an interface on which the first part of the information associated with the first key word is displayed, wherein the one or more function objects cause device to perform one or more corresponding functions in response to selection of the one or more function objects;
receive an input associated with the first part of information;
in response to receiving the input associated with the first part of information, obtain, from a server associated with a database comprising transaction information, a second part of information associated with the first key word, to obtain the second part of information comprises:
send a query to the server, wherein the sending the query to the server is included in the one or more functions performed in response to selection of the one or more function objects, the query comprising the first key word; and
obtain, from the server, a response to the query, the response to the query comprising the second part of information, wherein the second part of information corresponds to a transaction associated with a user account, the server associated with the database comprising transaction information not requiring a user associated with the user account to input credentials in order for the second part of information to be provided in connection with the query; and
causing a second message to be displayed, the second message being based at least in part on the second part of information associated with the first key word, wherein the second message is displayed on a same interface on which the first part of information is displayed; and
a memory coupled to the one or more processors and configured to provide the one or more processors with instructions.

24. A computer program product, the computer program product being embodied in a non-transitory computer readable storage medium and comprising computer instructions for:
receiving, by a terminal, a first message comprising a first key word;
in response to receiving an input associated with displaying the first message, displaying, by the terminal, a first part of information associated with the first key word, the displaying the first part of information associated with the first keyword comprising:
providing one or more function objects on an interface on which the first part of the information associated with the first key word is displayed, wherein the one or more function objects cause the terminal to perform one or more corresponding functions in response to selection of the one or more function objects;
receiving an input associated with the first part of information;
in response to receiving the input associated with the first part of information, obtaining, from a server associated with a database comprising transaction information, a second part of information associated with the first key word, the obtaining the second part of information comprising:
sending a query to the server, wherein the sending the query to the server is included in the one or more functions performed in response to selection of the one or more function objects, the query comprising the first key word; and
obtaining, from the server, a response to the query, the response to the query comprising the second part of information, wherein the second part of information corresponds to a transaction associated with a user account, the server associated with the database comprising transaction information not requiring a user associated with the user account to input credentials in order for the second part of information to be provided in connection with the query; and
displaying a second message based at least in part on the second part of information associated with the first key word, wherein the second message is displayed on a same interface on which the first part of information is displayed.

* * * * *